United States Patent [19]

Hoke

[11] 4,299,712

[45] Nov. 10, 1981

[54] EPOXIDE OR EPISULFIDE POLYMER-BASED HOT MELT METAL WORKING LUBRICANTS

[75] Inventor: Donald I. Hoke, Chagrin Falls, Ohio

[73] Assignee: The Lubrizol Corporation, Wickliffe, Ohio

[21] Appl. No.: 152,911

[22] Filed: May 23, 1980

Related U.S. Application Data

[62] Division of Ser. No. 15,398, Feb. 26, 1979, Pat. No. 4,237,188.

[51] Int. Cl.[3] ..... C10M 1/28

[52] U.S. Cl. ..... 252/52 A; 72/42; 252/45; 252/48.2

[58] Field of Search ..... 252/45, 48.2, 52 A; 72/42

[56] References Cited

U.S. PATENT DOCUMENTS

| | | | |
|---|---|---|---|
| 2,481,278 | 9/1949 | Ballard et al. | 252/52 A X |
| 2,510,540 | 6/1950 | Ballard et al. | 252/52 A X |
| 2,914,491 | 11/1959 | Bailey, Jr. | 252/52 A X |
| 4,129,717 | 12/1978 | Praetorius et al. | 252/52 A X |
| 4,237,188 | 12/1980 | Hoke | 252/52 A X |

OTHER PUBLICATIONS

Millett, W. H., "Polyether Synthetic Lubricants", Iron & Steel Engineer, pp. 51-58, Aug., 1948.

Serov et al., "Properties of Certain Polyalkylene Glycols for use in Synthetic Lubricant-Coolant Fluids", Chem. & Tech. of Fuels & Oils, vol. 12, Nos. 1 and 2, Jan. Feb. 1976.

*Primary Examiner*—Andrew Metz

*Attorney, Agent, or Firm*—Ronald L. Lyons; William H. Pittman; Raymond F. Keller

[57] ABSTRACT

Metal working operations, especially drawing, are facilitated by applying to the metal a composition which provides lubricity thereto, which melts at about 30°-150° C., and which comprises principally a polymer of a monoepoxide or monoepisulfide containing from about 8 to about 25 carbon atoms. The composition may be applied in liquid form and solidifies on cooling to ambient and normal storage temperatures. Prior to application, the composition is preferably heated to a temperature higher than its melting temperature for ease of flow and uniform dispersion thereof onto the metal.

14 Claims, No Drawings

EPOXIDE OR EPISULFIDE POLYMER-BASED HOT MELT METAL WORKING LUBRICANTS

This application is a division of copending application Ser. No. 15,398, filed Feb. 26, 1979, now U.S. Pat. No. 4,237,188.

This invention relates to metal working operations. More particularly, it relates to compositions useful as lubricants during such operations, to methods for lubricating metal during such operations, and to metal workpieces so lubricated.

Metal working operations, for example, rolling, forging, hot-pressing, blanking, bending, stamping, drawing, cutting, punching, spinning and the like generally employ a lubricant to facilitate the same. Lubricants greatly improve these operations in that they can reduce the power required for the operation, prevent sticking and decrease wear of dies, cutting bits and the like. In addition, they frequently provide rust inhibiting properties to the metal being treated.

Since it is conventional to subject the metal to various chemical treatments (such as the application of conversion coating solutions) after working, a cleaning operation is necessary between the working step and the chemical treatment step. In addition to the above properties, therefore, it is preferred that the working lubricant be easily removable from the metal surface by ordinary cleaning compositions.

Heretofore, the lubricants applied for the above purposes have ordinarily been liquids. The equipment used for the application of such liquids is often expensive to maintain and inconvenient to use. In addition, a dry-off oven is usually required to remove the water or solvent carrier from the liquid composition, which also greatly adds to the capital costs and operating and maintenance expenses of the method. Difficulties are also often encountered in automatic feeding of metal blanks and otherwise handling the metal because the liquid compositions which are normally applied to the metal make it wet and slippery and consequently difficult to handle.

A principal object of the present invention, therefore, is to provide an improved metal working method.

A further object is to provide a method using lubricants which impart to the metal being worked a unique combination of properties including lubricity, corrosion resistance, extreme pressure properties and protection against wear of working parts, and which in addition are relatively easy to remove from the surface of the metal by cleaning after the working operation is completed.

A further object is to provide novel compositions for use in the improved method.

Another object is to provide a method by which a solid metal working composition can be melted and applied to the metal, thereby eliminating the need for dry-off ovens and their attendant drawbacks.

Still another object is to provide a method by which the composition, after application to the metal, solidifies to produce a non-blocking film.

Other objects will in part be obvious and will in part appear hereinafter.

According to this invention, the above objects are fulfilled by applying to the metal to be worked a composition which provides lubricity thereto and which comprises at least one polymer of at least one monoepoxide or monoepisulfide, said monoepoxide or monoepisulfide having the formula

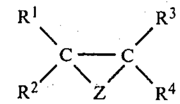

wherein $R^1$ is a substantially aliphatic hydrocarbon-based radical, each of $R^2$, $R^3$ and $R^4$ is individually hydrogen or a substantially aliphatic hydrocarbon-based radical, Z is oxygen or sulfur, and the total number of aliphatic carbon atoms in $R^1$, $R^2$, $R^3$ and $R^4$ is from about 6 to about 23; said composition melting within the range of about 30° to about 150° C. Preferably, the composition melts to form a readily flowable liquid which is capable of easy and efficient application to the metal surface. One advantage of such a composition (sometimes referred to hereinafter as the "hot melt composition") is that metals coated therewith are easier to handle under normal storage conditions than metals coated with previously known lubricants.

The principal necessary characteristic of the hot melt composition is its capability of providing lubricity to the metal surface. For this purpose, lubricity may be defined in many ways which are well known to those skilled in the art, and in terms of a number of test methods which, in one way or another, simulate metal working operations. For the purpose of this invention, a composition is deemed to provide lubricity to a metal workpiece if its use results in a deviation of 100 foot-pounds or less when tested by the following method:

A cold-rolled steel strip, $2'' \times 13\frac{1}{2}''$, is drawn between two dies in an Instron Universal Tester, Model TT-C. Prior to drawing, the edges of the strip are deburred and the strip is vapor degreased and wiped with a clean cloth. It is then coated uniformly with a drawing lubricant and mounted in the testing machine. The dies are tightened by means of a torque wrench set at 40 foot-pounds torque and the strip is pulled through the die for two inches at the rate of five inches per minute. The force or "load", in foot-pounds, required to pull the strip through the die, and the deviation from a uniform load, are recorded on a chart.

The hot melt composition melts in the range of 30°–150° C., as previously indicated. Thus, it is normally solid at ambient temperature and pressure. The preferred melting range is 30°–100° C., with 35°–70° C. and especially 38°–55° C. being particularly desirable. When melted, the composition preferably forms a readily flowable liquid.

The principal ingredient of the hot melt composition is, as previously indicated, a polymer of a monoepoxide or monoepisulfide having the indicated formula. Polymers of monoepoxides are preferred. In the formula, the radical $R^1$ and sometimes also the radicals $R^2$, $R^3$ and $R^4$ are substantially aliphatic hydrocarbon-based radicals. The term "aliphatic hydrocarbon-based radical" as used herein denotes a radical having a carbon atom directly attached to the remainder of the molecule and having predominantly aliphatic hydrocarbon character within the context of this invention. Such radicals include the following:

(1) Aliphatic hydrocarbon radicals; that is, aliphatic radicals such as butyl, hexyl, octyl, dodecyl, tetradecyl, pentadecyl, octadecyl, butenyl, dodecenyl and octadecenyl. All isomers of these are included, but straight-chain radicals are preferred.

(2) Substituted aliphatic hydrocarbon radicals; that is, radicals containing non-hydrocarbon substituents which, in the context of this invention, do not alter the predominantly hydrocarbon character of the radical. Those skilled in the art will be aware of suitable substituents; examples are hydroxy, carbalkoxy (especially lower carbalkoxy) and alkoxy (especially lower alkoxy), the term "lower" denoting radicals containing not more than 7 carbon atoms.

(3) Hetero radicals; that is, radicals which, while having predominantly aliphatic hydrocarbon character within the context of this invention, contain atoms other than carbon present in a chain or ring otherwise composed of aliphatic carbon atoms. Suitable hetero atoms will be apparent to those skilled in the art and include, for example, oxygen, nitrogen and sulfur.

In general, no more than about three substituents or hetero atoms, and preferably no more than one, will be present for each 10 carbon atoms in the aliphatic hydrocarbon-based radical.

The term "substantially aliphatic" as used herein means that the radical comprises an aliphatic hydrocarbon-based chain which may, however, contain non-aliphatic substituents thereon. Such substituents include aromatic (e.g., phenyl and naphthyl), alicyclic (e.g., cyclohexyl and cyclopentyl) and heterocyclic (e.g., piperidyl and morpholino) groups. Such non-aliphatic groups will comprise no more than about 10% by weight of the substantially aliphatic hydrocarbon-based radical.

For the most part, $R^1$ and each of the other R radicals which are not hydrogen will comprise an aliphatic hydrocarbon radical and usually an alkyl radical. Monoepoxides wherein the epoxy group is in the $\alpha,\beta$-position (those in which $R^3$ and $R^4$ are hydrogen) are preferred and those in which $R^2$ is also hydrogen are especially preferred. Most desirable are epoxides of this type in which R is an alkyl radical (especially a straight chain one) containing from about 10 to about 18 carbon atoms. Mixtures of such epoxides, including commercially available mixtures, are contemplated as suitable for the preparation of polymers for use in the invention.

Illustrative epoxides and episulfides whose polymers are useful as hot melt compositions in accordance with this invention are 1-octene oxide, 2-octene oxide, 2,4,4-trimethyl-1-pentene oxide, 1-dodecene oxide, 1-hexadecene oxide, 1-eicosene oxide, butyl epoxystearate, and commercial mixtures of $C_{12-18}$ straight chain $\alpha$-olefin epoxides. Polymers of the corresponding episulfides are also useful.

The hot melt composition comprises at least one polymer of an epoxide or episulfide as described above. Suitable polymers include homopolymers of any single epoxide or episulfide and interpolymers containing units derived from more than one such epoxide, episulfide or mixture of epoxides with episulfides. They also include interpolymers of an epoxide or episulfide as described above with a lower or higher molecular weight epoxide or episulfide, usually a lower alkyl one such as ethylene oxide, propylene oxide or the corresponding sulfides. In general, such a copolymer containing units derived from epoxides or episulfides other than those described above will contain a major amount, usually above about 60% by weight, of units derived from epoxides or episulfides having the above formula. The number average molecular weight of the polymer is generally between about 500 and 10,000 as determined by gel permeation chromatography, and preferably between about 800 and about 2000.

The use of mixtures of two or more epoxide or episulfide polymers as a hot melt composition is also within the scope of the invention. Specifically contemplated, and themselves considered part of the invention, are hot melt compositions comprising a mixture of (A) at least one polymer as described hereinabove and (B) at least one polymer of ethylene oxide, propylene oxide or a mixture thereof. Such compositions will generally contain at least 50% by weight, and preferably about 70–95%, of component A. Component B usually also has a number average molecular weight between about 500 and about 10,000, as determined by gel permeation chromatography.

The epoxide or episulfide polymers are prepared by methods known in the art for the preparation of such polymers. A preferred method of preparation involves maintaining the epoxide or episulfide at a temperature up to about 60° C., preferably from about 30° to about 50° C., in the presence of a Lewis acid catalyst such as boron trifluoride or fluoboric acid. The preparation of suitable epoxide polymers is illustrated by the following examples; all parts are by weight.

EXAMPLE 1

1-Hexadecene oxide (2000 parts) is cooled to 22° C. under nitrogen and 29 parts of a 50% aqueous solution of fluoboric acid is added slowly over 3 hours, with stirring. The reaction temperature is maintained at 36°–43° C. by intermittent cooling. The temperature is maintained at 40°–43° C. for one hour and is then increased to 50° C. as an additional 5 parts of fluoboric acid solution is added. The catalyst is neutralized by the addition of 11 parts of sodium carbonate and the product is filtered through a filter aid material to yield the desired epoxide polymer having a number average molecular weight of 1592 as determined by gel permeation chromatography.

EXAMPLE 2

An epoxide interpolymer is prepared by polymerizing a commercial mixture of $C_{12-18}$ straight chain $\alpha$-olefin epoxides by the method of Example 1.

EXAMPLE 3

An interpolymer is prepared by the method of Example 1 from 1500 parts of 1-hexadecene oxide and 500 parts of 1-hexadecene sulfide.

It is within the scope of this invention to incorporate other known additives in minor amounts (typically about 0.01–5.0% by weight) into the hot melt metal working lubricant composition. Especially preferred other additives are antioxidants, typically hindered phenols; such materials are well known in the art. Other suitable additives include:

Surfactants, usually nonionic surfactants such as oxyalkylated phenols and the like.

Extreme pressure agents, including chlorinated waxes, sulfurized hydrocarbons, sulfurized esters, and phosphorus acid salts of the formula

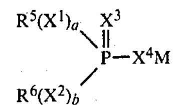

wherein M is a Group I metal, a Group II metal, aluminum, tin, cobalt, lead, molybdenum, manganese, nickel or ammonium; each of $R^5$ and $R^6$ is a hydrocarbon-based radical; each of $X^1$, $X^2$, $X^3$ and $X^4$ is oxygen or sulfur; and each of a and b is 0 or 1, and especially wherein M is zinc, $X^1$ and $X^2$ are oxygen, $X^3$ and $X^4$ are sulfur, and $R^5$ and $R^6$ are lower alkyl radicals.

Corrosion, wear and rust inhibiting agents.

Friction modifying agents, of which the following are illustrative: Alkyl or alkenyl phosphates or phosphites in which the alkyl or alkenyl group contains about 10–40 carbon atoms, and metal salts thereof, especially zinc salts; $C_{10-20}$ fatty acid amides; $C_{10-20}$ alkyl amines, especially tallow amines, and ethoxylated derivatives thereof; salts of such amines with acids such as boric acid or phosphoric acid which have been partially esterified as noted above; $C_{10-20}$ alkyl-substituted imidazolines and similar nitrogen heterocycles; sulfurized derivatives of sperm oil and other fatty oils; basic barium or calcium salts of such oils or of amine-formaldehyde condensates, especially those derived from tallow amines such as described above; and gels derived from basic alkaline earth metal sulfonates.

Melting point modifiers, typically relatively low melting point esters such as dioctyl phthalate.

The hot melt composition may be prepared by intimately blending the ingredients thereof, preferably in the liquid state, if more than one ingredient is involved. It may sometimes be preferable to employ a substantially inert liquid diluent to insure intimate blending. By "substantially inert" is meant a diluent which does not undergo any appreciable reaction with the ingredients of the composition under the conditions of blending. Preferred as diluents are liquids which are solvents for the ingredients being blended; suitable solvents will be apparent to those skilled in the art and preferably comprise non-polar liquids such as benzene, toluene, xylene, chlorobenzene and the like. After blending is complete, the diluent is preferably removed, typically by evaporation.

Any metal to be worked may be treated according to the method of this invention; examples are ferrous metals, aluminum, copper, magnesium, titanium, zinc and manganese as well as alloys thereof and alloys containing other elements such as silicon.

The method of this invention includes any method by which a metal workpiece may be coated with the hot melt composition prior to or concurrently with the working operation. For example, a cutting blade or drawing die may be coated with the composition which is then transferred to the workpiece by contact. More usually, however, the workpiece is coated with the hot melt composition before the working operation. Thus, this invention also contemplates a metal workpiece having on its surface a film of the hot melt composition, whether in solid or liquid form. The hot melt composition will ordinarily form a continuous film over the entire surface of the workpiece. However, it is also within the scope of this invention to form a film on less than the entire surface of the workpiece.

The physical state of the hot melt composition during application to the metal surface is not critical. Thus, it may be applied as a solid (as by rubbing) or as a liquid (as by brushing, spraying, dipping, flooding, roller coating, reverse roller coating or the like). For ease and convenience of application, it is preferably applied in the liquid state, and when this is done the metal may be subsequently cooled whereupon the hot melt composition solidifies, or it may be passed directly to the metal working operation while the composition is in the liquid state. One of the advantages of this invention, however, is that the hot melt composition solidifies to form a solid, non-blocking film on the metal workpiece.

Drawing lubricants suitable for use in the method of this invention are listed in the following table.

| Ingredient | Parts by weight Lubricant | | | | |
|---|---|---|---|---|---|
| | A | B | C | D | E |
| Product of Example 1 | 100 | 80 | 75 | 80 | 70 |
| Product of Example 3 | — | 20 | — | — | 10 |
| Ethylene oxide polymer, mol. wt. about 2000 | — | — | 25 | — | 20 |
| $C_{14-18}$ trialkyl phosphite mixture | — | — | — | 20 | — |

The surface temperature of the metal at the time the hot melt composition is applied may vary, for example, from ambient temperature to just below the decomposition temperature thereof. Factors which will influence or determine the temperature of the metal at the time the composition is applied include processes which the metal is subjected to prior or subsequent to application of the composition, the melting point of the composition, and the temperature thereof at the time of application. Using the hot melt compositions described hereinabove, metal surface temperatures of about 20°–125° C. at the time of application have been found particularly useful. The temperature of the hot melt composition should be higher than its melting temperature (preferably at least 10° C. higher and usually about 20°–40° C. higher) at the time of application for ease of flow and uniform dispersion of the composition onto the metal and coverage thereby.

The method of this invention, when employed substantially as described herein, results in the production of metal workpieces which are adequately lubricated for subsequent working operations, especially drawing; protected against rust; and easily cleanable by commercial cleaning methods.

What is claimed is:

1. A method for lubricating metal during working thereof which comprises applying to said metal a composition which provides lubricity thereto and which comprises at least one polymer of at least one monoepoxide or monoepisulfide, said monoepoxide or monoepisulfide having the formula

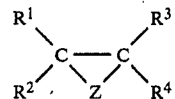

wherein $R^1$ is a substantially aliphatic hydrocarbon-based radical, each of $R^2$, $R^3$ and $R^4$ is individually hydrogen or a substantially aliphatic hydrocarbon-based radical, Z is oxygen or sulfur, and the total number of aliphatic carbon atoms in $R^1$, $R^2$, $R^3$ and $R^4$ is from about 6 to about 23; said composition melting within the range of about 30° to about 150° C.

2. A method according to claim 1 wherein Z is oxygen.

3. A method according to claim 2 wherein $R^1$ is an aliphatic hydrocarbon radical and each of $R^2$, $R^3$ and $R^4$ is hydrogen.

4. A method according to claim 3 wherein the polymer is prepared by the action of a Lewis acid on said epoxide.

5. A method according to any of claims 1-4 wherein $R^1$ is an alkyl radical containing from about 10 to about 18 carbon atoms.

6. A method according to claim 5 wherein the polymer has a number average molecular weight between about 500 and about 10,000.

7. A method according to claim 6 wherein $R^1$ is a straight chain tetradecyl radical.

8. A composition which melts within the range of about 30° to about 150° C. and which comprises:

(A) At least 50% by weight of at least one polymer of at least one monoepoxide or monoepisulfide, said monoepoxide or monoepisulfide having the formula

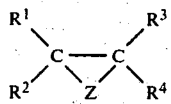

wherein $R^1$ is a substantially aliphatic hydrocarbon-based radical, each of $R^2$, $R^3$ and $R^4$ is individually hydrogen or a substantially aliphatic hydrocarbon-based radical, Z is oxygen or sulfur, and the total number of aliphatic carbon atoms in $R^1$, $R^2$, $R^3$ and $R^4$ is from about 6 to about 23; and (B) At least one polymer of ethylene oxide or propylene oxide.

9. A composition according to claim 8 wherein Z is oxygen.

10. A composition according to claim 9 wherein $R^1$ is an aliphatic hydrocarbon radical and each of $R^2$, $R^3$ and $R^4$ is hydrogen.

11. A composition according to claim 10 wherein component A is prepared by the action of a Lewis acid on said epoxide.

12. A composition according to any of claims 8-11 wherein $R^1$ is an alkyl radical containing from about 10 to about 18 carbon atoms.

13. A composition according to claim 12 wherein component A has a number average molecular weight between about 500 and about 10,000.

14. A composition according to claim 13 wherein $R^1$ is a straight chain tetradecyl radical.

* * * * *